Dec. 24, 1968  L. M. TIPTON  3,417,800
GRINDING APPARATUS
Filed July 21, 1966  3 Sheets-Sheet 1
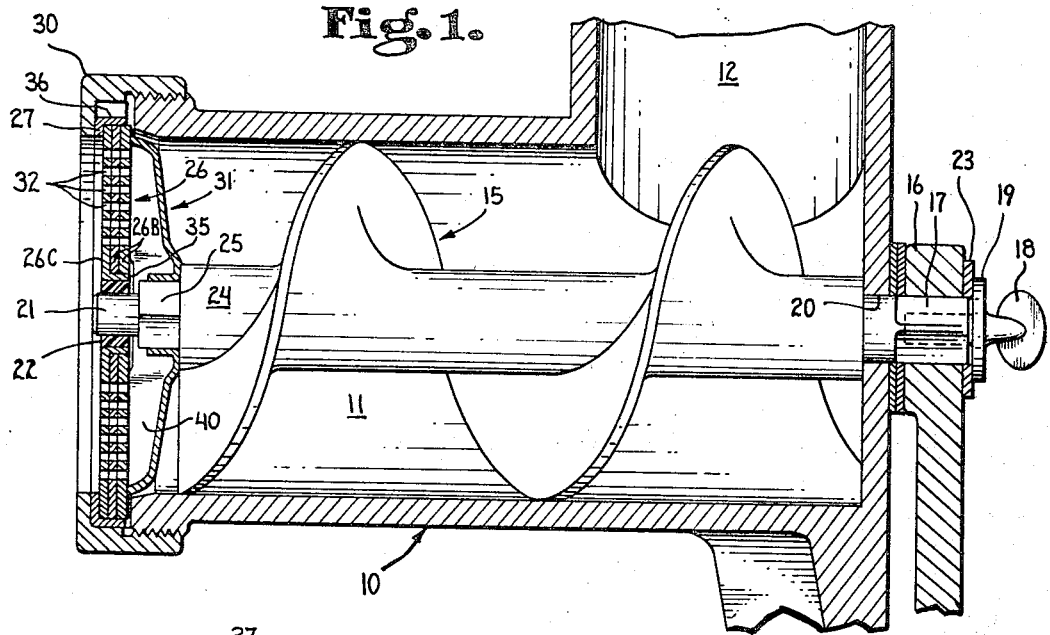
Fig. 1.
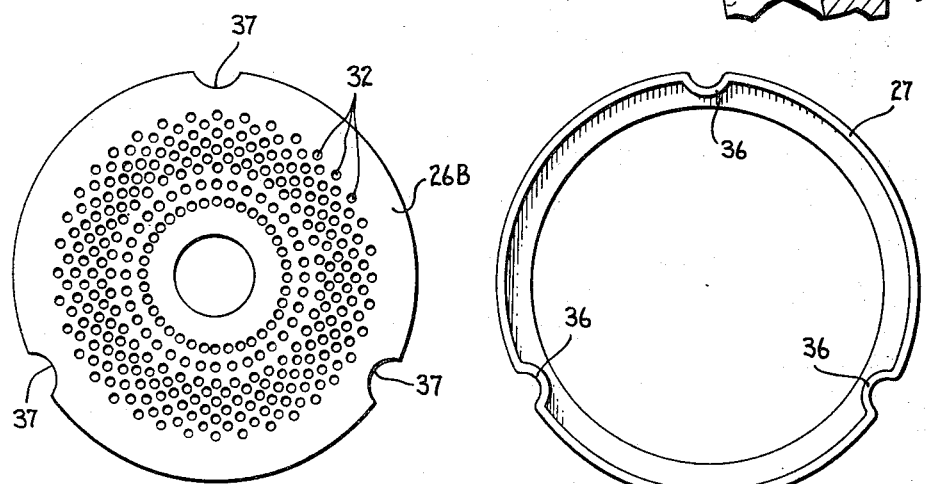
Fig. 2.
Fig. 4.
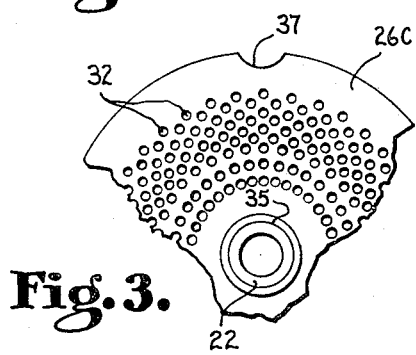
Fig. 3.
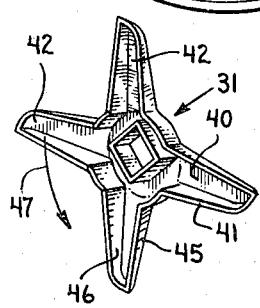
Fig. 5.
INVENTOR
Larry M. Tipton
BY Woodard, Weikart, Emhardt & Naughton
Attorneys Dec. 24, 1968  L. M. TIPTON  3,417,800
GRINDING APPARATUS Filed July 21, 1966  3 Sheets-Sheet 2

INVENTOR.
Larry M. Tipton

BY Woodard, Weikart, Emhardt & Naughton
Attorneys.

Dec. 24, 1968  L. M. TIPTON  3,417,800
GRINDING APPARATUS
Filed July 21, 1966  3 Sheets-Sheet 3

INVENTOR.
LARRY M. TIPTON
BY Woodard, Weikart, Emhardt & Naughton
Attorneys

United States Patent Office 3,417,800
Patented Dec. 24, 1968

3,417,800
GRINDING APPARATUS
Larry M. Tipton, 316 Wood Road,
Anderson, Ind. 46011
Continuation-in-part of application Ser. No. 329,669,
Dec. 11, 1963. This application July 21, 1966, Ser. No.
566,918
3 Claims. (Cl. 146—186)

ABSTRACT OF THE DISCLOSURE

Apparatus for grinding and chopping meat including a cutter plate assembly made up of a plastic backing plate and a metal face plate. Another embodiment of the cutter plate assembly includes a plurality of stacked metal cutter plates.

---

The present invention relates to meat grinding and food chopping and is a continuation-in-part of my copending application Ser. No. 329,669, now Patent No. 3,286,551.

Presently available meat grinding devices incorporate a cast cutter blade and a one-piece cast plate. It has been found that slight misalignment of the plate and blade of such a device will result in uneven wear of the cutting surfaces. One object of the present invention is to provide a grinder incorporating parts which are less expensive and more flexible than previously used cast parts. Another object of the invention is to provide a grinder incorporating automatic means for preventing uneven wear of the cutting surfaces of the plate and blade of the grinder.

Still another object of the invention is to provide an improved device for grinding or chopping food and meat.

A further object of the present invention is to provide an improved cutter plate assembly.

Related objects and advantages will become apparent as the description proceeds.

One embodiment of the meat grinder of the present invention might include a cylindrical housing, a plurality of parallel plates having a plurality of aligned openings therethrough, said plates being arranged in stacked engagement with one another, an annular internally threaded cap threadedly received on the end of said housing, a worm coaxially received in said cylindrical housing and having a reduced square shaped portion on the end thereof and a further reduced cylindrical portion on the end of said square shaped portion, an annular bearing mounted on one of said plates, said cylindrical portion being received in said bearing, a cutter blade received on said square shaped portion in engagement with said stack of cutter plates and being shaped generally as a four pointed star.

The full nature of the invention will be understood from the accompanying drawings and the following description and claims:

FIG. 1 is a longitudinal section of a grinder embodying the present invention.

FIG. 2 is a plan view of a cutter plate making up a portion of the structure of FIG. 1.

FIG. 3 is a plan view of a further cutter plate making up a further portion of the structure of FIG. 1.

FIG. 4 is a plan view of an annular retainer making up a further portion of the structure of FIG. 1.

FIG. 5 is a perspective view of a cutter blade making up a still further portion of the structure illustrated in FIG. 1.

Figure 6:
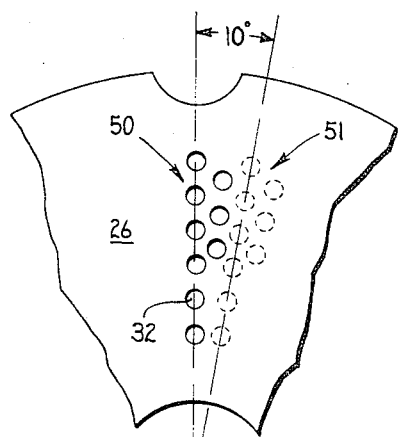
FIG. 6 is a plan view of a cutter plate such as the one illustrated in FIG. 2 showing an intermediate step in the manufacture of the cutter plate.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to FIG. 1, there is illustrated a grinder including a housing 10. The housing 10 has a cylindrical chamber 11 which is fed by a vertical passage 12. Received within the housing 10 and the cylindrical chamber 11 is a worm 15 which can be driven by an arm 16 received upon a square shaped end portion 17 on the worm. The worm 15 is journalled within a cylindrical opening 20 at one end of the housing 10 and has a reduced diameter portion 21 which is journalled within a bearing 22 at the opposite end of the housing 10. The arm 16 is secured to the worm 15 by a screw 18 having a flange 19 retaining washer 23 and the arm 16 on the portion 17.

The worm 15 is rotated in such a direction as to move meat and the like leftwardly as viewed in FIG. 1 along the cylindrical chamber 11 from the passage 12. Worm 15 has a square shaped portion 25 joining its reduced diameter portion 21 and the cylindrical stem 24 of the worm. A plurality of cutter plates 26 are held in position at the end of the chamber 11 by means of an annular retainer 27 and an annular internally threaded cap 30 which is threadedly received on the end of the housing 10. A cutter blade 31 is received upon the square shaped portion 25 and rotates with the worm 15 to cut and mash against material being pressed up against the stack of plates 26 whereby the worm can force the material through the aligned openings 32 in the plates 26.

It will be noted that all of the plates 26 are not identical in that the plates 26B do not include the central flange 35 of the plate 26C. The bearing 22 (also shown in FIG. 3) is fixedly mounted within the central flange 35. In other respects, however, the plate 26C is identical to the plates 26B. The various apertures 32 through the plates 26B and 26C are maintained aligned by the retainer 27 which has three inwardly projecting portions 36 extending into three recesses 37 in the outer peripheries of each of the plates 26B and 26C.

Referring to FIGS. 5 and 1, the cutter blade 31 is hollowed out at 40, said hollowed out portion 40 opening on the face of the blade which engages the stack of cutter plates 26. The cutter blade 31, therefore, has a portion 41 which surrounds the hollowed out portion and which engages the first of the two cutter plates 26B. It has been found that the construction illustrated in FIG. 5 is self-sharpening and because of the two contact portions 45 and 46 of each cutter blade arm 42, the following portion 46 of the cutter blade arm scrapes clean the cutting face of the cutter plate 26B. It has been further found that the two portions 45 and 46 of each contact arm 46 increase the stability of the cutter plates and blade assembly in the meat grinder. It will be noted that the portion 45 of each cutter blade arm is flat while the portion 46 of each cutter blade arm curves around and meets the portion 45. The cutter blade arms are so designed because the cutter blade 31 rotates in the direction of the arrow 47 and, therefore, the material being forced through the openings 32 is pushed ahead of and upon the surface 45 of each arm.

Figure 7:
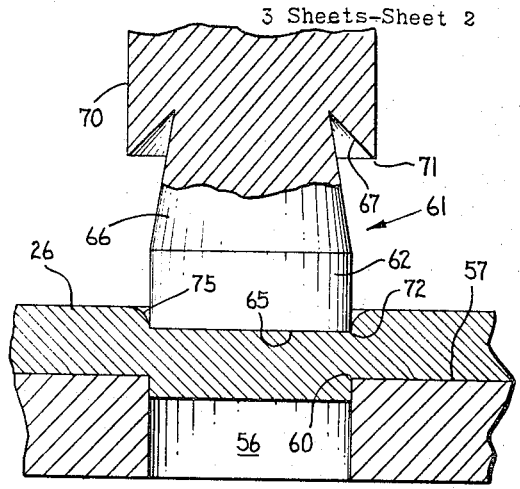
FIG. 7 is a vertical section through a cutter plate and apparatus for operating on the cutter plate and showing a preliminary step in the manufacture of a cutter plate.
Figure 8:
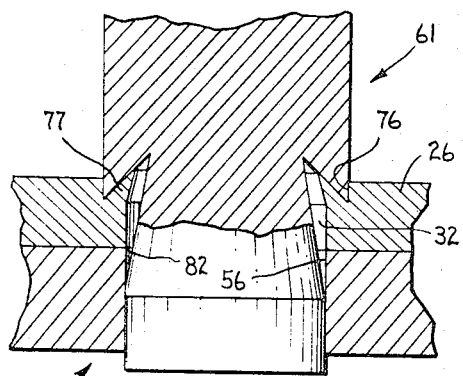
FIG. 8 is a view similar to FIG. 7 showing a further step in the process of manufacture of the cutter plate.
Figure 9:
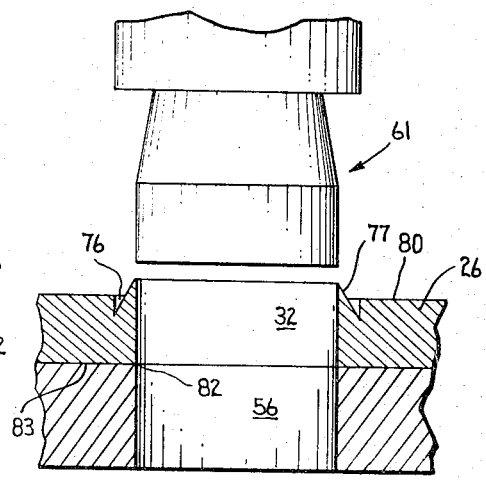
FIG. 9 is a view similar to FIGS. 7 and 8 and showing a still further step in the manufacture of the cutter plate.

Referring now to FIG. 6, the manner in which the cutter plate 26B or 26C is manufactured is illustrated. A stamping device, shown schematically in FIGS. 7–9, is indexed through repeated ten degree angles to repeat the stamping pattern shown at 50, thus the dotted lines at 51 show the location of the next set of apertures to be stamped. Since such indexing and stamping of sheet metal is conventional, the conventional apparatus used is not illustrated.

Applicant's invention does include, however, novel stamping or punching means for forming the apertures 32 in a cutter plate 26. Such stamping means might include the above mentioned indexing apparatus or might be independent thereof. This novel apparatus includes a support 55 having a cylindrical opening 56 therein, said cylindrical opening having its axis perpendicular to the surface 57 of the support and meeting the surface 57 at a relatively sharp edge 60. A cutter plate 26 to be stamped is placed upon the support 55 and is punched by the punch element 61. The punch element 61 includes a distal portion 62 which is cylindrical and which has a sharply squared off distal end 65. Adjoining the cylindrical portion 62, which is of the same diameter as the opening 56, is a frusto-conically shaped surface 66 which converges inwardly away from the distal portion 62 and is coaxial of the cylindrical portion 62.

A further frusto-conical portion 67 has a greater apex angle than the frusto-conical portion 66 and flares outwardly generally toward the distal end of the punching element 61. A cylindrical surface 70 is located proximally of the cylindrical portion 62 and has a greater diameter than said portion 62. The cylindrical portion 70 adjoins and intersects the frusto-conical portion 67 to define a sharp edged punch 71 spaced radially outwardly of the sharp edged punch surface 62 defined by the intersection of the distal end 65 and the cylindrical portion 62.

The steps of the process of the present invention are shown serially in FIGS. 7–9. It can be seen that the punch edge 72 first is used to punch through the plate 26 into the opening 56. This results in a deforming of the plate in such a manner that the surface 75 is rounded off. It is necessary, however, in the final cutter plate 26 to have a sharp edge at the juncture of the cutter plate aperture 32 and the surface of the cutter plate against which the blade 31 rotates. The annular punch portion 71 functions to punch out a recess 76 surrounding the opening 32. The punching of the recess 76 causes the material 77 adjacent the opening to move upwardly and inwardly to the position shown in FIG. 8. The punch element 61 is then withdrawn from the support 55 and the cutter blade 26. The frusto-conical surface 66 of the punch element causes the material 77 to be pushed outwardly and still further upwardly so that the opening 32 is cylindrical throughout its entire length. It will also be noted that the material 77 extends upwardly above the surface 80 of the cutter plate 26.

Figure 10:
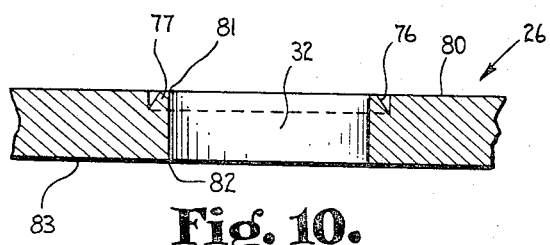
FIG. 10 is a view similar to FIGS. 7-9 showing the final cutter plate after manufacture thereof is complete.

The next step of the process is the grinding off of the surface 80 to remove the portion of the material 77 which projects above the surface 80 and to align the remaining portion of the material 77 with the surface 80 to achieve the result illustrated in FIG. 10. It will be noted in FIG. 10 that a sharp edge is provided at 81 where the surface 80 intersects the surface of the aperture 32. The sharp edge 81 is very useful in the grinding operation since it cooperates with the cutter blade 31 to shear the food or meat.

It will be evident from the above description that the present invention provides a meat grinder including parts which are less expensive and more flexible than previously used cast parts. This is true because of the fact that the two cutter plates 26B can be reversed and/or interchanged to provide additional sharp cutting surfaces against which the blade 31 can operate when the cutting surfaces of a plate are dulled. It can be seen that the edge 82 (FIG. 10) of the cutter plate 26 will be sharp because of the particular punching action by which it is manufactured and that no formation of a recess such as 76 is necessary to provide the proper sharp edge at surface 83.

Figure 11:
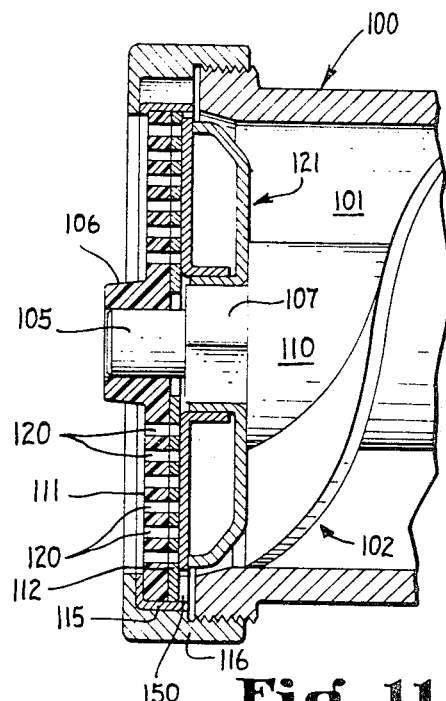
FIG. 11 is a view similar to FIG. 1 of an alternative embodiment of the present invention.
Figure 12:
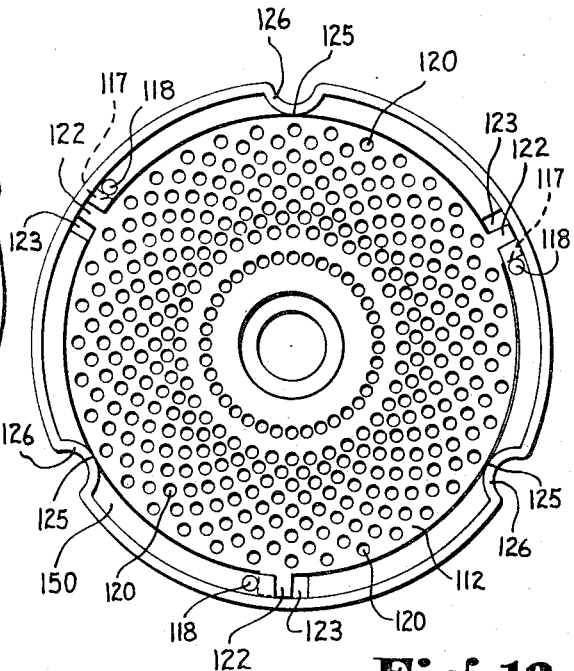
FIG. 12 is a plan view of a cutter plate assembly forming a part of the structure of FIG. 11.
Figure 13:
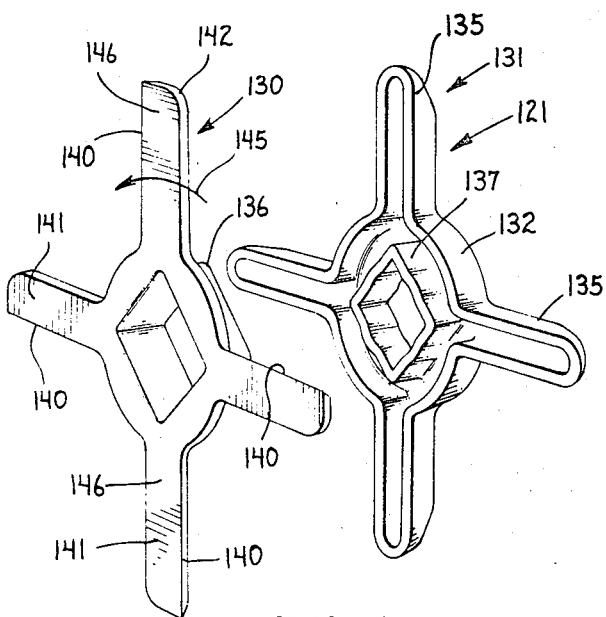
FIG. 13 is an exploded perspective view of a cutter blade or cutter blade assembly forming a part of the structure of FIG. 11.

Referring now more particularly to FIGS. 11, 12 and 13, there is illustrated an alternative embodiment of the grinder of FIGS. 1–5. The grinder of FIGS. 11, 12 and 13 is identical to the grinder of FIGS. 1–5 except as described below. In other words, the portion of the grinder not shown in fragmentary FIG. 11 is identical to the grinder of FIG. 1.

Referring to FIG. 11, the grinder includes a housing 100 having a cylindrical chamber 101 through which food or the like is driven or moved by means of a worm 102. The worm 102 has a reduced diameter portion 105 which is journalled within a bearing 106 at the end of the housing 100. The worm 102 is rotated in such a direction as to move meat and the like leftwardly as viewed in FIG. 11 along the cylindrical chamber 101. The worm 102 has a square shaped portion 107 joining its reduced diameter portion 105 and the cylindrical stem 110 of the worm.

A pair of plates 111 and 112 are held in position at the end of the chamber 101 by means of an annular retainer 115 and an annular internally threaded cap 116 which is threadedly received on the end of the housing 100. A cutter blade or cutter blade assembly 121 is received upon the square shaped portion 107 and rotates with the worm 102 to cut and mash against the material being pressed up against the stack of plates 111 and 112, whereby the worm can force the material through the aligned openings 120 in the plates 111 and 112.

The plate 111 mounts or has formed integrally therewith the bearing 106. The plate 111 is formed of plastic such as, for example, nylon so as to provide a relatively soft or resiliently deformable material for mounting of the plate 112 which cooperates with the cutter blade 121 to cut and extrude the material being operated upon in the chamber 101. Because of the fact that the cutter plate 112 is easily removed and replaced, maintenance of the grinder is made relatively easy.

Referring to FIG. 12, the manner of mounting of the cutter plate 112 on the backup plate 111 is illustrated. The plate 112 has three radially outwardly extending fingers 122 which are received within slots 123 in the backup plate 111. The slots 123 extend first axially of the backup plate 111 from the rightward face thereof as illustrated in FIG. 11 and then extend rotationally in a clockwise direction as the plate is viewed in FIG. 12. At the base or deepest portion 117 of each of the slots 123 there is imbedded a pin 118 which acts as a limit for movement of the fingers 122. It can be appreciated that the pins 118 act to limit the rotation of the cutter plate 112 when the openings 120 of the cutter plate 112 are aligned with the openings 120 of the backup plate 111.

The backup plate 111 is held against rotation relative to the retainer 115 in exactly the same manner that the plates 26A and 26B are held against rotation relative to the retainer 27, that is, by means of three recesses 125 in the outer periphery of the plate 111 and by the three inwardly projecting portions 126 which extend into the three recesses 125 and engage the plate 111 in a friction fit relationship.

Referring to FIG. 13, the cutter blade or cutter blade assembly 121 includes a cutter blade insert 130 and a cutter blade mount 131. The cutter blade mount 131 has a hub portion 132 and has four radially extending arms 135, said hub portion 132 being hollowed out to receive the insert 130. The insert 130 is generally a flat piece of metal which has been punched at its center to form a rectangular flange 136 which fits over and grips the similarly shaped but smaller flange 137 forming a part of the hub 132. The rectangular shapes of both of the flanges 136 and 137, of course, operate to prevent rotation of the insert 130 relative to the mount 131.

The cutter blade insert 130 has a leading portion 140 on each of its arms 141, which leading portion is straight, while the following portion 142 of each cutter blade arm 141 curves around and meets the portion 140. The cutter blade arms 141 are designed in this manner because the cutter blade 121 rotates in the direction of the arrow 145 and, therefore, the material being forced through the openings 120 is pushed ahead of and upon the surface 140 of each arm 141. The junction of each portion 140 and the front face 146 of each arm 141 is sharpened to provide a cutting surface to cooperate with the sharp openings 120 in the cutter plate 12. Because of the relatively inexpensive construction of the cutter blade insert 130, it is very easy and convenient to remove the cutter blade insert 130 and to replace it with a new insert instead of attempting to sharpen the cutting edges of the insert.

It should be mentioned that the backup plate 111 includes a cylindrical portion 150 which is located at the outer periphery of the backup plate 111 and which extends or projects rightwardly as viewed in FIG. 11 so as to receive and cup therewithin the cutter plate 112. One of the advantages of the use of the plastic backup plate 111 is the fact that it is resiliently deformable and, consequently, provides an automatic means for preventing uneven wear of the cutting surfaces of the plate 112 and the cutter blade 121. Also, the backup plate 111 automatically provides the bushing 106 which can be cast integrally with the backup plate.

It can be seen that the cutter plate assembly of the present invention provides the advantage of a retainer ring in both of the illustrated embodiments, said retainer ring facilitating the handling of the cutter plate assembly outside of the grinder such as, for example, when the cutter plate assembly is being stored. Of course, the cutter plate assembly referred to in the preceding sentence is either the cutter plate assembly made up of the three stacked plates 26A and 26B and the retainer 27, as well as the bearing 22, and also the cutter plate assembly made up of the retainer 115, the backup plate 111 and the cutter plate 112. As mentioned above, one of the advantages of the first described embodiment of the grinder is the fact that the two plates 26B can be used interchangeably to provide a new or fresh cutting surface against which the blade 31 can operate. Also, the plates 26B can be reversed in their direction so that the backside thereof can be used. This is also true of the cutter plate 112 of the embodiment of FIGS. 11, 12 and 13.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A grinder comprising a cylindrical housing; a plurality of parallel plates having a plurality of aligned openings therethrough, said plates being arranged in stacked engagement with one another, an annular retainer receiving said plates, means for maintaining the openings of said plates in alignment, an annular internally threaded cap threadedly received on the end of said housing and receiving said retainer and plates and holding them against said housing, a worm coaxially received in said cylindrical housing and having a reduced square shaped portion on the end thereof and a further reduced cylindrical portion on the end of said square shaped portion, an annular bearing mounted on one of said plates, said cylindrical portion being received in said bearing, a cutter blade received on said square shaped portion in engagement with said stack of cutter plates and being shaped generally as a four-pointed star, said plurality of plates including a plastic plate and a metal plate, said plastic plate being resiliently deformable, said means for maintaining said openings of said plates in alignment comprising said metal plate having radially outwardly extending fingers, said plastic plate having radially outwardly extending slots adapted to receive said fingers, said metal plate being rotatable relative to said plastic plate with said fingers in said slots to secure said metal plate to said plastic plate, said plastic plate and said retainer having mutually engaging projections and recesses.

2. The invention of claim 1 additionally comprising metal pins each embedded in said plastic plate at the base of a respective one of said slots, said metal pins acting as limits for said fingers for positioning said openings in alignment.

3. A cutter plate assembly comprising a plurality of parallel plates having a plurality of aligned openings therethrough, said plates being arranged in stacked engagement with one another, an annular retainer receiving said plates, said plurality of plates including a plastic plate and a metal plate, said plastic plate and said retainer having mutually engaging projections and recesses, said metal plate having radially outwardly extending fingers, said plastic plate having radially outwardly extending slots adapted to receive said fingers, said metal plate being rotatable relative to said plastic plate with said fingers in said slots to secure said metal plate to said plastic plate, and a plurality of metal pins each embedded in said plastic plate at the base of a respective one of said slots, said metal pins acting as limits for said fingers for positioning said openings in alignment.

References Cited

UNITED STATES PATENTS

| | | | |
|---|---|---|---|
| 431,230 | 7/1890 | Leopold | 146—189 |
| 1,080,875 | 12/1913 | Mayfield et al. | 146—189 X |
| 1,122,055 | 12/1914 | Asbury | 146—189 |
| 1,514,271 | 11/1924 | Tilden | 146—189 |
| 1,695,898 | 12/1928 | Laemmel | 146—189 |
| 2,916,069 | 12/1959 | Williams | 146—189 |

FOREIGN PATENTS

| | | |
|---|---|---|
| 875,566 | 6/1942 | France. |
| Ad. 8,937 | 1904 | Great Britain. |

W. GRAYDON ABERCROMBIE, *Primary Examiner.*